UNITED STATES PATENT OFFICE.

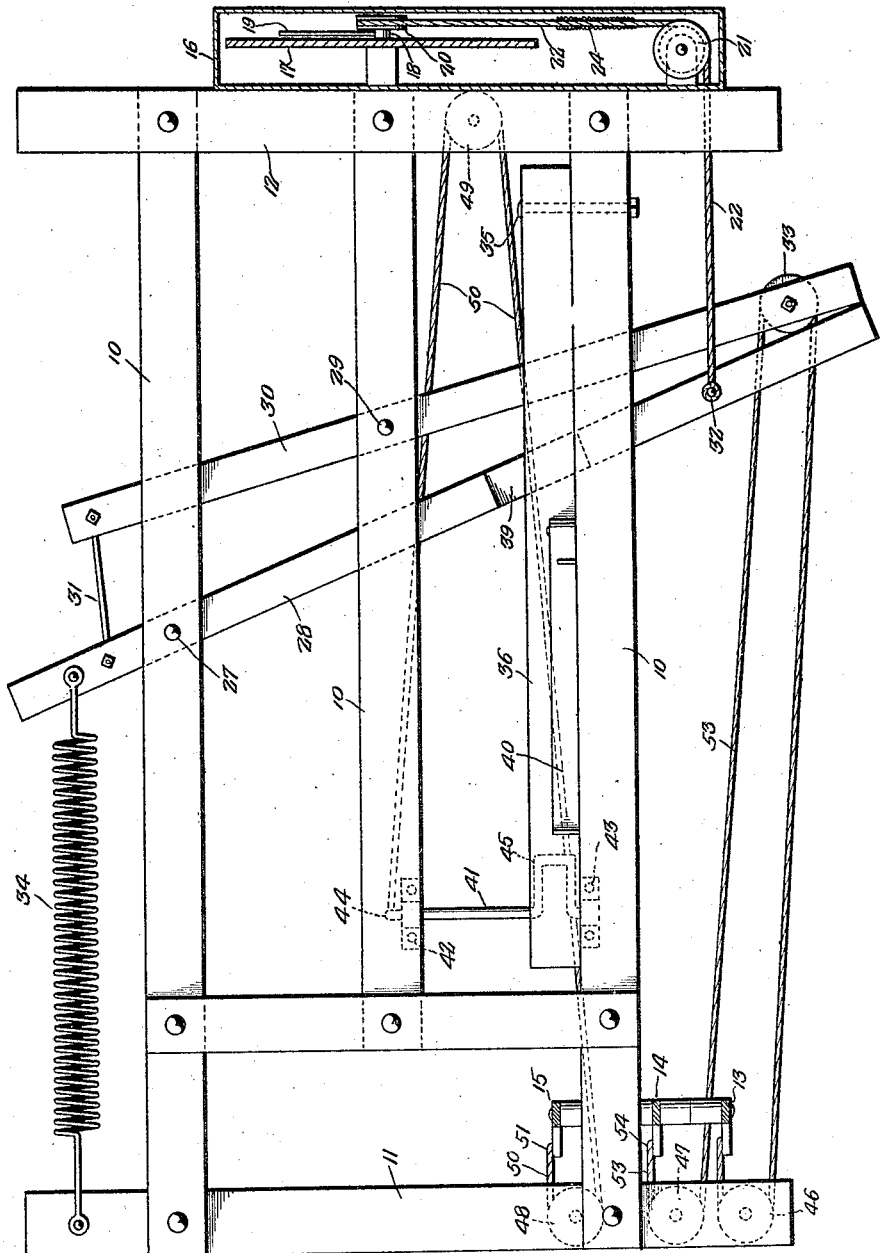

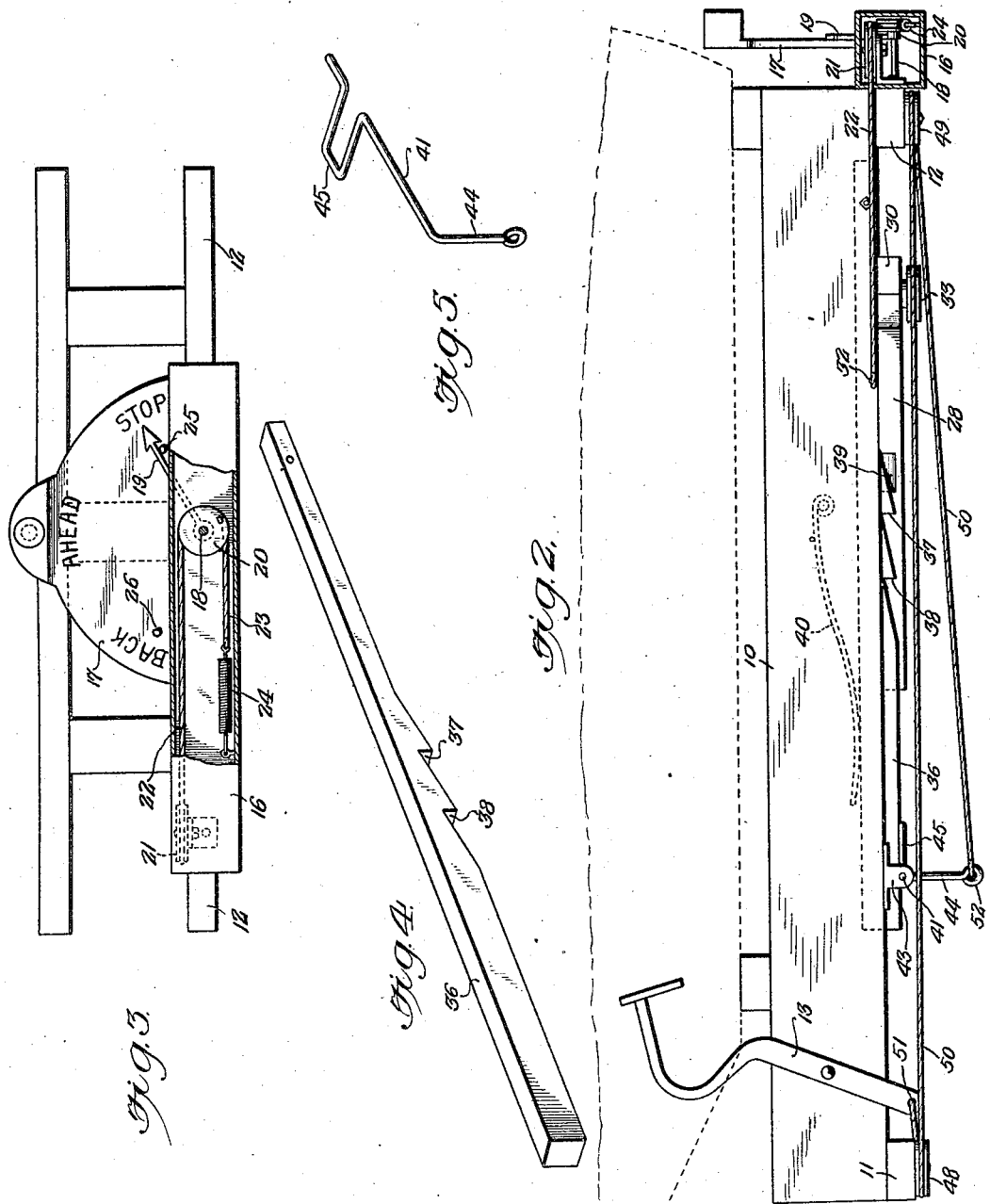

JASPER ALFRED BEEMER, OF ASTORIA, OREGON.

SIGNAL FOR MOTOR-DRIVEN VEHICLES.

1,419,105.   Specification of Letters Patent.   Patented June 6, 1922.

Application filed September 7, 1921. Serial No. 499,032.

*To all whom it may concern:*

Be it known that I, JASPER A. BEEMER, a citizen of the United States, residing at Astoria, in the county of Clatsop and State of Oregon, have invented certain new and useful Improvements in Signals for Motor-Driven Vehicles, of which the following is a specification.

This invention relates to signal devices for attachment to a motor driven vehicle to indicate the contemplated direction of movement of the vehicle to a following vehicle or pedestrians, and has for one of its objects to simplify and improve the construction and increase the efficiency and utility of devices of this character.

Another object of the invention is to provide a device of this character which may be adapted to the different constructions of motor driven vehicles without material structural change either in the vehicle or the improved signalling apparatus.

With these and other objects in view the invention consists in the construction and novel combination and arrangement of parts hereinafter fully described, illustrated in the accompanying drawings, and pointed out in the claims hereto appended, it being understood that various changes in the form, proportion, size and minor details of construction, within the scope of the claims, may be resorted to without departing from the spirit of the invention or sacrificing any of the advantages thereof.

In the accompanying drawings:

Figure 1 is a plan view of a portion of the frame work of a conventional motor driven vehicle with the improved signalling apparatus applied.

Fig. 2 is a side elevation, partly in section, of the parts shown in Fig. 1.

Fig. 3 is an end elevation, partly in section, of the parts shown in Figs. 1 and 2.

Fig. 4 is a detached perspective view of the swinging toothed stop bar.

Fig. 5 is a detached perspective view of the rock shaft or releasing member.

For the purpose of illustration the improved device is shown applied to a portion of the frame work or chassis of a motor driven vehicle, and includes longitudinally spaced members 10, a transverse forward member 11 and a transverse rear member 12. The main clutch lever is indicated at 13, the reverse clutch lever at 14, and the brake lever at 15, of conventional form.

Clutches and brake elements are not disclosed in the drawing, as they form no part of the present invention.

Supported upon the rear transverse member 12 is a casing 16 having a dial member 17 associated therewith, the latter having the usual data "Back," "Ahead," and "Stop" as shown in Fig. 3.

A shaft 18 extends through the casing 16 and carries a finger or pointer 19 operative over the dial and the indicating legends thereon.

The shaft 18 also carries a cable or cord pulley 20 within the casing 16, while another cable guide pulley 21 is mounted in the casing to receive a pull cable or cord 22, one end of the latter being connected to the pulley 20. Also connected to the pulley 20 is a short section of a pull cable 23 having a pull spring 24 therein.

Stops 25 and 26 are preferably located at the ends of the path of the pointer 19 to limit the movement or "play" of the pointer.

By this arrangement it is obvious that a pulling action on the cable 22 will move the pointer 19 over the dial against the resistance of the spring 24, and the latter will return the pointer to initial position when the strain on the cable 22 is withdrawn.

Pivoted at 27 to one of the frame members 10 is a lever arm 28, and pivoted at 29 to another of the frame members is another lever arm 30, the members 28 and 30 being coupled at one end by a rod 31.

The pull cable 22 is connected at 32 to the lever arm 28, while the lever arm 30 is provided with a cable guide pulley 33.

A relatively strong pull spring 34 is connected at one end to one of the frame members 10 and at the other end to the lever arm 28.

Pivoted at 35 to one of the frame members 10 is a bar 36 having stop teeth 37 and 38 in its lower face, while the lever arm 28 is provided with a beveled or inclined portion 39 and adapted to be engaged by the teeth when the bar is actuated, as hereafter described.

A spring 40 is arranged to bear on the bar 36 and hold it yieldably in downward position.

A rock shaft 41 is mounted by bearings 42 and 43 on the frame members 10, and is provided with a crank arm 44 at one end and an intermediate offset 45 bearing normally beneath the free end of the bar 36.

Supported upon the frame member 11 in advance of the pedals 13, 14 and 15 are cable guide pulleys 46, 47 and 48, one for each of the pedals, as indicated, while a similar cable guide pulley 49 is mounted beneath the rear frame member 12.

A pull cable 50 is connected at one end at 51 to the brake lever 15 and passed thence around the guide pulleys 48 and 49 and connected at the other end at 52 to the crank arm 44 of the rock shaft 41.

Another pull cable 53 is connected at one end at 54 to the reverse lever 14 and passed thence around the guide pulleys 47—33 and 46 in the order named and attached at the other end at 55 to the main clutch member 13.

It will be understood that the attachment of the cables to the clutch and brake levers in no way interferes with their usual operation.

With an apparatus thus constructed, the operation is as follows:

Initially the parts will be in the position shown in the drawings with the pointer 19 directed toward the legend "Stop," or with the vehicle at a standstill.

If the vehicle is to move forwardly, the operator operating the main clutch lever 13, which movement exerts a pulling force on the cable 53 and draws the lever 30 forwardly and at the same time carries the lever 28 with it against the resistance of the spring 34.

As the levers 28 and 30 are thus moved the inclined portion 39 of the lever arm 28 engages the nearest tooth 37 of the bar 36 and is thus locked from retrograde movement.

The pointer 19 will thus be held over the legend "Ahead" so long as the vehicle is moving forwardly.

If the operator stops the vehicle the brake is first applied by actuating the lever or pedal 15, which movement exerts a pulling force on the cable 50 and thus actuates the rock shaft 41 and causes the offset 45 to elevate the bar 36 and release the lever 28 when the spring 34 will return the levers 28 and 30 to normal position and likewise strain the cable 22 and permit the spring 24 to return the pointer to its first position, or opposite the legend "Stop."

If the vehicle is to be backed the operator in actuating the reverse pedal or lever 14 applies the strain to the cable 53 for a greater length to move the lever members 28 and 30 to a correspondingly greater length to cause the portion 39 to engage the other tooth or stop 38 of the bar 36 and likewise move the cable 22 to an extent sufficient to move the pointer to the end of its path and opposite the legend "Back" on the dial.

It will thus be seen that the pointer is controlled by the movements of the ordinary clutch, reverse and brake levers or pedals, and without the necessity for employing additional levers to actuate the device.

A device so constructed can be applied to automobiles of various forms, without material structural change either in the apparatus or in the automobile, and operates efficiently as above described.

The preferred embodiment of the invention is disclosed in the drawings and set forth in the specification, but it will be understood that modifications within the scope of the claimed invention may be made in the construction without departing from the principle of the invention or sacrificing any of its advantages.

What I claim is:

1. A device of the class described including a dial having a plurality of indicating characters, a finger movable over said dial and the characters thereon, a lever device pivoted intermediate the ends, a swinging bar having a plurality of inclined stop teeth extending into the path of said lever device, means whereby the movement of said lever device actuates the finger of the dial, means adapted to be actuated by the main clutch mechanism of a motor driven vehicle to move said lever device to cause the same to be engaged by one of said stop teeth and to correspondingly move the finger over the dial to a point opposite one of the indicating characters thereon, means adapted to be actuated by the reverse clutch mechanism of a motor driven vehicle to move said lever device to cause the same to be engaged by the other of said stop teeth and to simultaneously move the finger of the dial to a point opposite another of the indicating characters thereon, and means adapted to be actuated by the brake actuating mechanism of a motor driven vehicle to release the levers and permit them to be returned to their first position and simultaneously permit the finger of the dial to be returned to its first position.

2. A device of the class described including a dial having a plurality of indicating characters, a finger movable over said dial and the characters thereon, coacting levers coupled at one end and pivoted intermediate their ends, a swinging bar having a plurality of inclined stop teeth extending into the path of said levers, means whereby the movement of said lever device actuates the fingers of the dial, means adapted to be actuated by the main clutch mechanism of a motor driven vehicle to move said coupled levers to cause them to be engaged by one of said stop teeth and to correspondingly move the finger over the dial to a point opposite one of the indicating characters thereon, means adapted to be actuated by the reverse clutch mechanism of a motor driven vehicle to move said lever device to cause one of the same to be engaged by the other of said stop teeth and to simultaneously move the finger of the dial to a point opposite another of the indicating characters thereon, means adapted to be actuated by the brake actuating mechanism of a motor driven vehicle to release the levers and permit them to be returned to their first position and simultaneously permit the finger of the dial to be returned to its first position.

3. A device of the class described including a dial having a plurality of indicating characters, a finger movable over said dial and the characters thereon, a lever device pivoted intermediate the ends, a swinging bar having a plurality of inclined stop teeth extending into the path of said lever device, means whereby the movement of said lever device actuates the finger of the dial, means adapted to be actuated by the main clutch mechanism of a motor driven vehicle to move said lever device to cause the same to be engaged by one of said stop teeth and to correspondingly move the finger over the dial to a point opposite one of the indicating characters thereon, means adapted to be actuated by the reverse clutch mechanism of a motor driven vehicle to move said lever device to cause the same to be engaged by the other of said stop teeth and to simultaneously move the finger of the dial to a point opposite another of the indicating characters thereon, a rock shaft having a lateral extension in contact with said swinging bar, means adapted to be actuated by the brake actuating mechanism of a motor driven vehicle to actuate the rock shaft and thereby release the levers and permit them to be returned to their first position and simultaneously permit the finger of the dial to be returned to its first position.

4. The combination with a motor driven vehicle including a main clutch controlling lever, a reverse controlling lever and a brake controlling lever, of a dial having the words Ahead, Back, and Stop thereon in spaced relation, a pointer movable over the dial, means whereby the operation of the main clutch controlling lever disposes the pointer toward the word Ahead, means whereby the operation of the reverse controlling lever disposes the pointer toward the word Back, and means whereby the operation of the brake lever releases the pointer and permits it to be returned by the reaction of the spring to its initial position.

5. The combination with a motor driven vehicle including a main clutch actuating means, a reverse clutch actuating means and a brake actuating means, of a dial having a plurality of indicating characters, a finger movable over the dial and the characters thereon, means operative by the main clutch actuating means to move said finger over the dial to a point opposite one of the indicating characters thereon, means operative by the reverse clutch actuating means to move the finger over the dial to a point opposite another of the indicating characters thereon, and means operative by the brake operating means to release the finger and permit it to return to its initial position.

6. In a motor driven vehicle, a yieldably supported pointer, a driving clutch operating means connected to move the pointer into one position against the resistance of the yieldable means, a reverse clutch operating means connected to move the pointer into another position against the resistance of its yieldable means, and a brake operating means connected to release said pointer and permit it to be automatically returned to initial position by the reaction of its yieldable means.

7. In an apparatus of the class described, a yieldably supported pointer, a plurality of operating levers, means whereby the action of one of said levers moves the pointer against the resistance of the yieldable means, and means whereby the action of another of said levers releases the pointer and permits the reaction of its yieldable means to automatically return it to initial position.

8. In an apparatus of the class described, a yieldably supported pointer, a plurality of operating levers, means whereby the action of one of said levers moves the pointer against the resistance of the yieldable means, a trip device connected to said pointer, and means whereby the action of another of said levers actuates said trip device and releases the pointer and permits the reaction of its yieldable means to automatically return it to initial position.

In testimony whereof, I affix my signature hereto.

JASPER ALFRED BEEMER.